United States Patent [19]
Theobald

[11] Patent Number: 5,859,522
[45] Date of Patent: Jan. 12, 1999

[54] ACCESSORY IDENTIFICATION APPARATUS AND METHOD

[75] Inventor: David J. Theobald, Woodstock, Ill.

[73] Assignee: Motorola, Inc., Schaumburg, Ill.

[21] Appl. No.: 895,391

[22] Filed: Jul. 16, 1997

[51] Int. Cl.⁶ .................................................. H01M 10/46
[52] U.S. Cl. .......................................................... 320/106
[58] Field of Search ..................................... 320/106, 110, 320/132, DIG. 12, DIG. 21, 105, 114, 147

[56] References Cited

U.S. PATENT DOCUMENTS

| | | | |
|---|---|---|---|
| 5,164,652 | 11/1992 | Johnson et al. | 320/2 |
| 5,184,059 | 2/1993 | Patino et al. | 320/15 |
| 5,313,661 | 5/1994 | Malmi et al. . | |
| 5,460,901 | 10/1995 | Syrjälä | 429/90 |
| 5,489,834 | 2/1996 | Pitkanen | 320/15 |
| 5,546,317 | 8/1996 | Andrieu | 364/481 |

FOREIGN PATENT DOCUMENTS 2 239 567   7/1991   United Kingdom .

OTHER PUBLICATIONS

Motorola Product List Web Page, Motorola Original Adapters, Personal Cellular Phone Adapters, p. 1, 1997.
Motorola Product List Web Page, Motorola Original Hands Free Systems, Personal Cellular Phone Hands Free Solutions, p. 1, 1997.
Motorola Product List Web Page, Motorola Original Chargers, Personal Cellular Phone Chargers, pp. 1 & 2, 1997.

*Primary Examiner*—Edward H. Tso
*Attorney, Agent, or Firm*—Mark D. Patrick

[57] ABSTRACT

An accessory identification apparatus (195) used in an electronic device (102) includes a connector (122) to couple to an accessory (104) and a controller (108) coupled to the connector (122). The connector (122) includes an information pin (124) to receive information generated from operation of the accessory (104). The controller (108) identifies the accessory (104) from a voltage level generated by attachment of the accessory (104) to the information pin (124). Also, an accessory identification apparatus (195) used in an accessory (104) includes a connector (173) to couple to an electronic device (102) and an identification element (174) coupled to the connector (173). The connector (173) includes an information pin (179) to supply information generated from operation of the accessory (104). The identification element (174), upon attachment of the connector (173) to the electronic device (102), provides an identity of the accessory (104) via the information pin (179).

6 Claims, 2 Drawing Sheets

5,859,522

ACCESSORY IDENTIFICATION APPARATUS AND METHOD

FIELD OF THE INVENTION

This invention relates generally to electronic devices and accessories therefor and, more particularly, to an apparatus and method used to identify an accessory to an electronic device.

BACKGROUND OF THE INVENTION

Electronic devices, such as cellular telephones, have become increasingly popular. Those devices that are compatible with a large number of accessories have a commercial advantage. Accessories are used in association with the device to increase the functionality thereof. Accessories are attached to the device via an accessory connector thereof. One such accessory connector is the standardized eight pin J3-type accessory connector used in MicroTAC™ cellular telephones manufactured and sold by Motorola, Inc. from 1989 to the present. The J3-type accessory connector has an external power supply pin; an audio in pin; an audio out pin; data pins for high speed data communications according to the three-wire bus protocol used in radiotelephone products by Motorola, Inc.; and two ground pins in a predetermined arrangement.

To be compatible with the J3-type accessory connector, an accessory must have a connector that is designed to mate with the accessory connector and have the same number and arrangement of pins. To communicate its identity to the device, the accessory includes a logic circuit or microcontroller capable of driving high speed data communications on the data pins according to the three-wire bus protocol. Unfortunately, such logic circuits or microcontrollers are expensive and oftentimes double the cost of the accessory. Therefore, what is needed is a low cost apparatus and method of identifying an accessory to a device that maintains backward compatibility with existing accessories that use the accessory connector.

DETAILED DESCRIPTION OF THE PREFERRED EMBODIMENTS

An accessory identification apparatus used in an electronic device includes a connector to couple to an accessory and a controller coupled to the connector. The connector includes an information pin to receive information generated from operation of the accessory. The controller identifies the accessory from a voltage level generated by attachment of the accessory to the information pin. In addition, an accessory identification apparatus used in an accessory includes a connector to couple to an electronic device and an identification element coupled to the connector. The connector includes an information pin to supply information generated from operation of the accessory. The identification element, upon attachment of the connector to the electronic device, provides an identity of the accessory via the information pin. By using the information pin to provide a voltage level and to receive information generated from operation of the accessory, a low cost and backwards compatible accessory identification system is realized.

Figure 1:
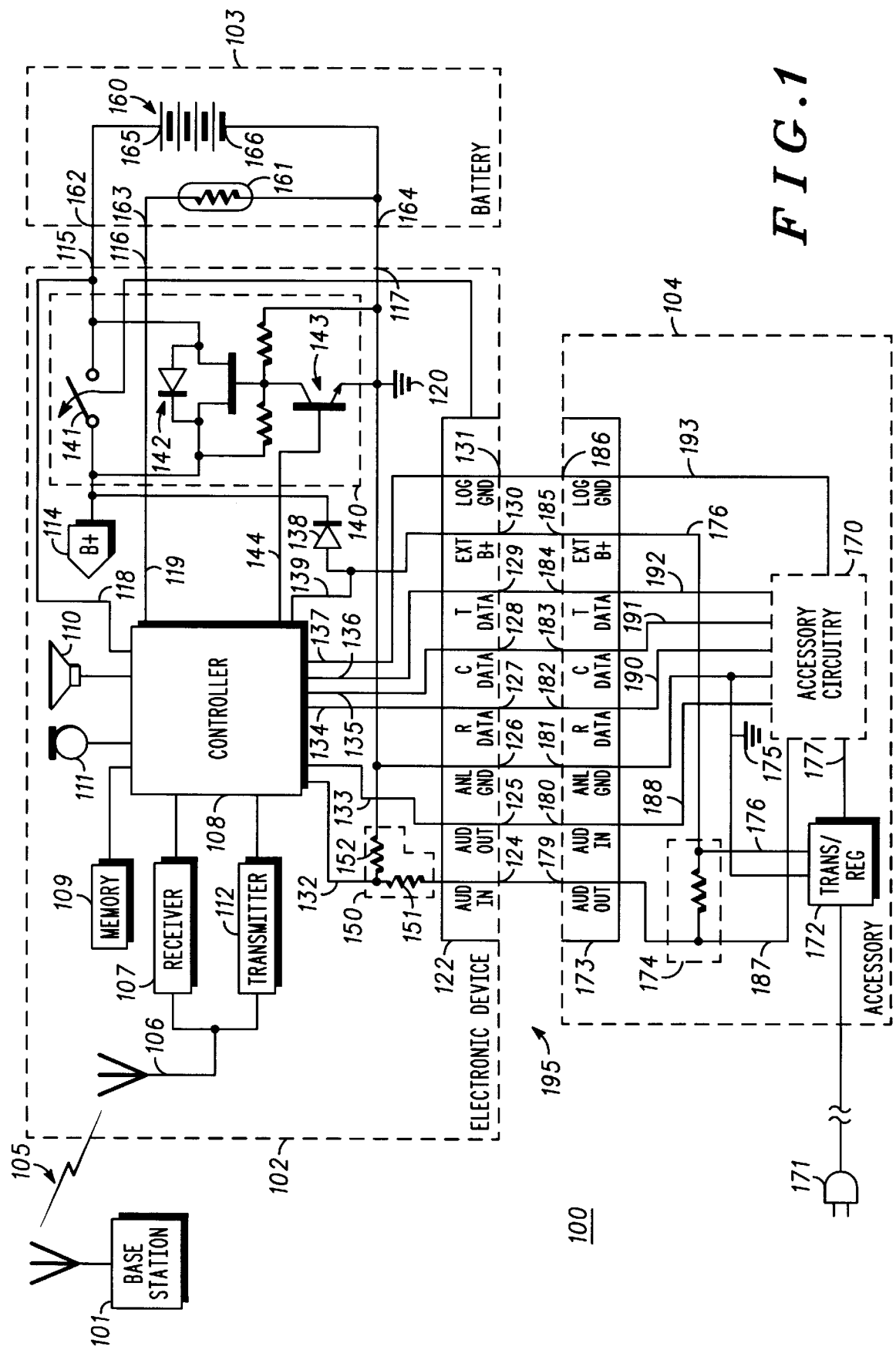
FIG. 1 illustrates, in partial block and partial schematical diagram form, an accessory identification system including an electronic device having an accessory identification apparatus, a battery, and an accessory.

FIG. 1 illustrates an accessory identification system 100. The accessory identification system 100 includes an electronic device 102, a battery 103, and an accessory 104. The electronic device 102 communicates with a base station 101, which provides wireless communications and features, such as paging, telephone, and short messaging, or the like, to the electronic device 102 when it is located within a geographic area served by the base station 101. The base station 101 and the electronic device 102 communicate with each other via a communication link, which is preferably radio frequency (RF) signals 105. In the illustrated embodiment, the electronic device 102 is a cellular telephone and the base station 101 is a cellular telephone service provider.

The electronic device 102 includes an antenna 106, a receiver 107, a controller 108, a memory 109, a speaker 110, a microphone 111, and a transmitter 112. The controller 108 includes a microprocessor, such as a 68HC11 microprocessor commercially available from Motorola, Inc., known synthesizer circuitry, and known audio logic circuitry. The controller 108 controls the operation of the electronic device 102 according to instructions read from the memory 109. The antenna 106 detects and emits the RF signals 105. The receiver 107 operates under control of the controller 108 to convert signals received by the antenna 106 into data signals input to the controller 108 for use thereby and into voice signals input to the controller 108 for output by the speaker 110 as audible speech. The transmitter 112 operates under control of the controller 108 to convert signals, which include data signals generated by the controller 108 and voice signals generated by the controller 108 from audible speech input via the microphone 111, for emission by the antenna 106.

The electronic device 102 has a supply terminal (B+) 114, battery terminals 115, 116, and 117, a connector 122, and a switch circuit 140. The supply terminal 114 supplies power to electrical circuitry of the electronic device 102, including but not limited to, the receiver 107, the controller 108, and transmitter 112 via electrical connections (not shown). The battery terminals 115–117 are for electrically connecting to the battery 103. Battery terminals 115 and 116 are monitored by the controller 108 via lines 118 and 119. Battery terminal 117 is coupled to an analog ground 120 of the electronic device 102.

The connector 122 is for physically and electrically connecting to the accessory 104. The connector 122 has multiple pins including information pins 124, 125, 127, 128, and 129 designated AUD IN, AUD OUT, and R, C, and T DATA, respectively; ground pins 126 and 131 designated ANL GND and LOG GND; and an external power supply pin 130 designated EXT B+. The information pin 124 is coupled to the controller 108 via audio in line 132 and an identification network 150. The identification network 150 is employed to identify the accessory 104. In the illustrated embodiment, the identification network 150 includes a resistor 151, having a value of 15 kΩ, coupled in series with the information pin 124 and the audio in line 132 and a resistor 152, having a value of 15 kΩ, coupled to the audio in line 132 and the analog ground 120 in a shunt configuration, which give the identification network 150 an impedance of approximately 30 kΩ looking in from the information pin 124. The information pin 125 is coupled to the controller 108 via audio out line 133. The information pins 127–129 are coupled to the controller 108 via data lines 134–136. The ground pins 126 and 131 are coupled to the analog ground 120 and to a logic ground of the controller 108 via line 137, respectively. The external power supply pin 130 is coupled to the supply terminal 114 via a diode 138. The external power supply pin 130 is monitored by the controller 108 via line 139. The connector 122 is preferably the standardized eight pin J3-type accessory connector employed by Micro-TAC™ cellular telephones manufactured and sold by Motorola, Inc. from 1989 to the present, but may be any other suitable multiple pin accessory connector having an external power supply pin and at least one information pin.

The switch circuit 140 selectively connects the battery terminal 115 to the supply terminal 114. The switch circuit 140 includes a mechanical switch 141, a transistor switch 142, and a control switch 143. The mechanical switch 141 is coupled to the connector 122, the supply terminal 114, and the battery terminal 115. The mechanical switch 141 electrically connects the supply and battery terminals 114 and 115 when the connector 122 is unattached and opens to electrically disconnect the supply and battery terminals 114 and 115 when the accessory 104 is physically attached to the connector 122.

The transistor switch 142 is coupled in parallel with the mechanical switch 141 to prevent interruption of power to the electronic device 102 when the mechanical switch 141 is opened or closed. The transistor switch 142 provides a conduction path between the supply and battery terminals 114 and 115 until a voltage level at the supply terminal 114 meets or exceeds a voltage level at the battery terminal 115 causing the transistor switch 142 to turn off. The transistor switch 142 is preferably a MOSFET (metal-oxide semiconductor field effect transistor) having gate and drain terminals coupled to the supply terminal 114, a source terminal coupled to battery terminal 115, and an intrinsic diode coupled across the source and drain terminals. One skilled in the art will recognize that the mechanical switch 141 in the aforementioned arrangement is redundant and the desired switching of the supply and battery terminals 114 and 115 can be accomplished using only the transistor switch 142.

The control switch 143 is coupled to the transistor switch 142 and the controller 108 via line 144 to selectively control the transistor switch 142. In response to an enable signal on line 144, the control switch 143 turns on and pulls the gate of the transistor switch 142 low, which in turn forces the transistor switch 142 to turn on and provide a current conduction path between the supply and battery terminals 114 and 115. The control switch 143 is preferably a BJT (bipolar junction transistor) having a collector terminal coupled to the gate of the transistor switch 142, a base coupled to the controller 108 via line 144, and an emitter coupled to the analog ground 120.

Although electronic device 102 is illustrated as a cellular telephone, the present invention will also find application in radios, portable computers, cordless telephones, two-way radios, pagers, personal digital assistants, tape recorders, and the like, and "electronic device" as used herein shall refer to all such battery powered electronic devices and their equivalents.

The battery 103 includes an electrochemical cell 160, a thermistor 161, and contacts 162–164. The electrochemical cell 160 includes a positive polarity terminal 165 coupled to contact 162 and a negative polarity terminal 166 coupled to contact 164. The electrochemical cell 160 is preferably rechargeable, and can be, for example, any one of the following chemical types: Nickel-Cadmium (NiCd), Nickel-Metal Hydride (NiMH), Alkaline, or Lithium Ion. In the illustrated embodiment, the electrochemical cell 160 supplies a battery voltage supply, preferably of 6 V DC (direct current), at the positive polarity terminal 165. The thermistor 161 is coupled to the contacts 163 and 164. A voltage level across the thermistor 161 forms a temperature signal corresponding to the temperature of the electrochemical cell 160.

The accessory 104 has a plug 171, a transformer and regulator 172, a connector 173, and an identification element 174. The accessory 104 can be a modem, a hands-free adapter, a battery saver, or the like, and includes accessory circuitry 170. The accessory circuitry 170 can include a microprocessor or microcontroller requiring a logic ground; and data or audio input/output devices such as a keypad, a microphone, or a speaker requiring a connection to an analog ground 175 of the accessory 104. However, in the illustrated embodiment, the accessory 104 is a mid rate charger or fast rate charger that does not include the accessory circuitry 170 and, thus, is low cost.

The plug 171 is compatible to mate with a conventional wall outlet (not shown) and provide external power (e.g., 110 V AC (alternating current) supply) to the accessory 104 from the outlet. Alternatively, the plug 171 could be compatible to mate with a cigarette lighter port to provide power to the accessory 104 from an automobile electrical system, or with another suitable power supply.

The transformer and regulator 172 is coupled to the plug 171 and has conventional circuitry. The transformer and regulator 172 provides an external power supply to connector 173 via line 176. In the illustrated embodiment, the external power supply is a current limited constant voltage supply supplying an 8.6 V DC output voltage for both the mid and fast rate chargers, a 340 mA current for the mid rate charger, and a 850 mA current for the fast rate charger. The transformer and regulator 172 preferably includes a tracking circuit that adjusts output power according to feedback received on line 176. In the event that the accessory 104 has the accessory circuitry 170, the transformer and regulator 172 outputs regulated power on line 177 to power the accessory circuitry 170. The transformer and regulator 172 is coupled to the analog ground 175.

The connector 173 is for physically and electrically connecting to the connector 122 of the electronic device 102. The connector 173 has multiple pins including information pins 179, 180, 182, 183, and 184 designated AUD OUT, AUD IN, and R, C, and T DATA, respectively; ground pins 181 and 186 designated ANL GND and LOG GND; and an external power supply pin 185 designated EXT B+. The information pins 179 and 180 are coupled to an audio out line 187 and an audio in line 188, respectively. The information pins 181–183 are coupled to data lines 190–192. The ground pins 181 and 186 are coupled to the analog ground 175 and logic ground line 193, respectively. The external power supply pin 185 is coupled to the transformer and regulator 172 via line 176.

The identification element 174 is employed to identify the accessory 104 to the electronic device 102. The identification element 174 has two ends, one end coupled to line 176 and the other end coupled to the audio out line 187. The identification element 174 is uniquely valued in each different type of the accessory 104. In other words, the identification element 174 is selected to have a different electrical value for each different type of the accessory 104. For example, in the illustrated embodiment, the identification element 174 employed in the mid rate charger accessory is a 120 kΩ resistor, and the identification element 174 employed in the fast rate charger accessory is a 36 kΩ resistor.

As will be further discussed below, accessory identification, in the illustrated embodiment, is primarily accomplished, in the electronic device 102, by the controller 108, the connectors 122, and the identification network 150 and, in the accessory 104, by the connector 173, the identification element 174, and the external power supply provided by the transformer and regulator 172, which collectively comprise an accessory identification apparatus 195.

Figure 2:
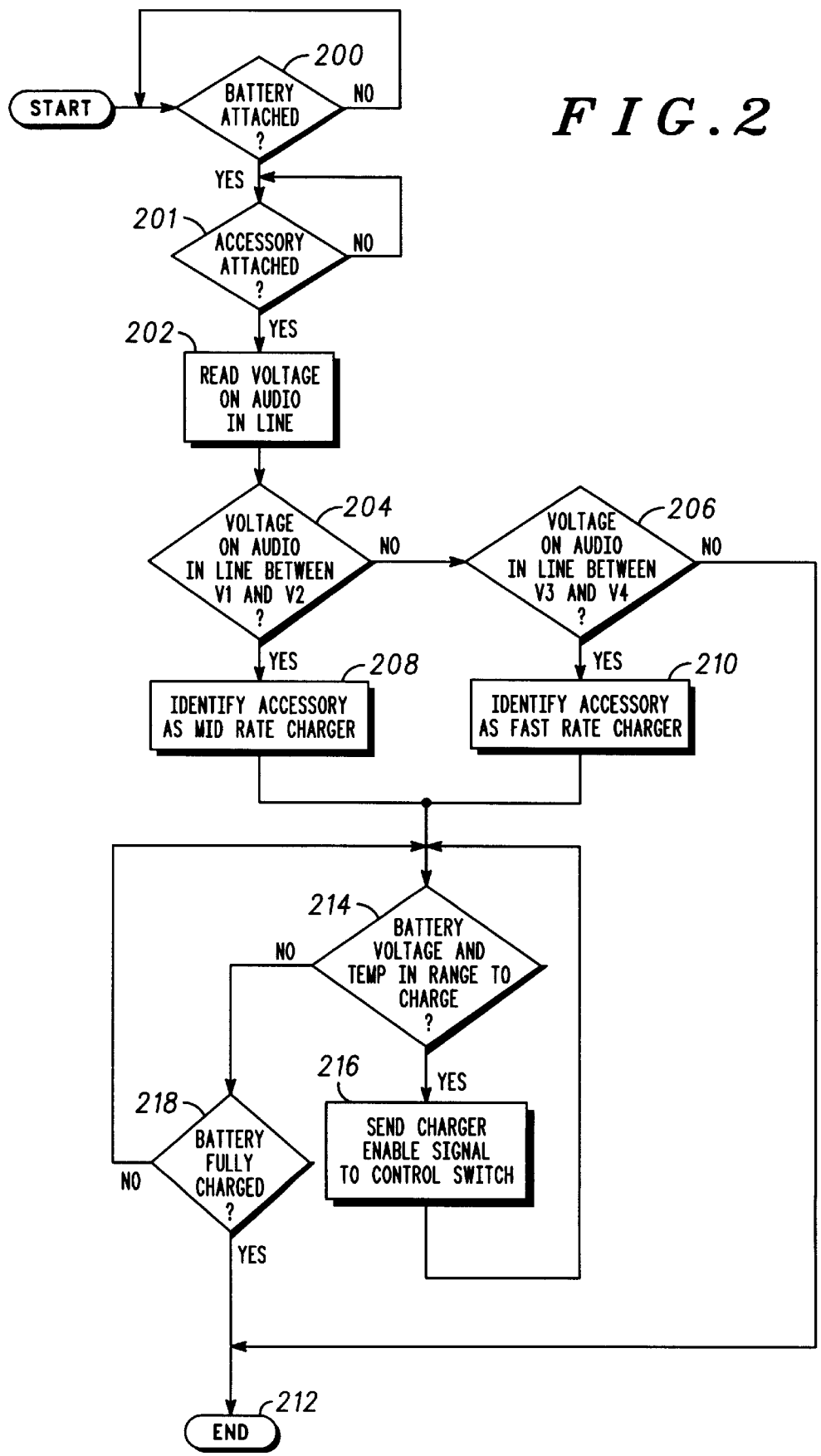
FIG. 2 illustrates, in flow chart form, an accessory identification method implemented by the electronic device of FIG. 1.

The accessory identification system 100 operates according to an accessory identification method shown in FIG. 2. Steps of the method of FIG. 2 are stored in the memory 109 of FIG. 1 as instructions, which are executed by the controller 108 in the following manner.

Referring to FIGS. 1 and 2, the controller 108 waits until the battery 103 is attached to the electronic device 102 (at step 200). The battery 103 is attached to the electronic device 102 when the contacts 162–164 of the battery 103 are physically mated with, and electrically connected to, the battery terminals 115–117, respectively. Upon attachment of the battery 103, the positive polarity terminal 165 of the electrochemical cell 160 is electrically connected to the supply terminal 114 and the electronic device 102 is powered by the battery voltage supply. The controller 108 detects attachment of the battery 103 from the presence of the battery voltage supply on line 118. The diode 138 prevents the power supplied by the battery 103 from draining out the connector 122. The electronic device 102 is powered from the battery 103 until it discharges to a voltage level that is insufficient to operate electronic device 102.

Next, the controller 108 waits until the accessory 104 is attached to the electronic device 102 (at step 201). The accessory 104 is attached to the electronic device 102 when the connectors 173 and 122 are physically mated so that the pins 179–186 and 124–131, respectively, are held in electrical contact. The mechanical switch 141 of the switch circuit 140 opens upon physical mating of the connectors 122 and 173. The transistor switch 142 of the switch circuit 140 turns off when the external power supply is supplied to the supply terminal 114 from the transformer and regulator 172 via the path of line 176, the pins 185 and 130, and the diode 138. The transistor switch 142 turns off because, in the illustrated embodiment, the voltage level of the external power supply at the supply terminal 114 is approximately 8.4 V after passing through the diode 138, which exceeds the battery supply voltage of approximately 6 V at the battery terminal 115. The controller 108 senses attachment of the accessory 104 from the presence of the external power supply on line 139. Once the mechanical switch 141 is open and the transistor switch 142 is off, the electrochemical cell 160 of the battery 103 is disconnected from the supply terminal 114 and the electronic device 102 is powered by the external power supply of the accessory 104.

Also upon attachment of the accessory 104, the identification element 174 of the accessory 104 is electrically connected to the identification network 150 of the electronic device 102 via the pins 179 and 124, and the analog grounds 175 and 120 are intercoupled via pins 181 and 126. The external supply voltage of the accessory 104, which is coupled to the identification element 174 via line 176, drives the identification element 174 and the identification network 150 to generate a voltage level on the audio in line 132 of the electronic device 102. In the illustrated embodiment, a voltage level of approximately 1.72 V is generated on the audio in line 132 when the mid rate charger accessory is attached and a voltage level of approximately 3.91 V is generated on the audio in line 132 when the fast rate charger accessory is attached. If the accessory 104 has the accessory circuitry 170, audio is communicated between the accessory circuitry 170 and the controller 108 via the path of audio out line 187–pin 179–pin 124–audio in line 132 and the path of audio out line 133–pin 125–pin 180–audio in line 188; data is communicated between the accessory circuitry 170 and the controller 108 via the path of data line 190–pin 181–pin 127–data line 134, the path of data line 191–pin 182–pin 128–data line 135, and the path of data line 192–pin 184–pin 129–data line 136 according to the three-wire bus protocol utilized in radiotelephone products manufactured and sold by Motorola, Inc. or other suitable high speed data communication protocol; and the logic grounds are intercoupled via lines 193 and 137 and pins 186 and 131.

Once the accessory 104 is attached, the controller 108 measures the voltage level on the audio in line 132 (at step 202). Next, the controller 108 compares the voltage level on the audio in line 132 to voltage level ranges stored in an accessory lookup table in the memory 109 (at steps 204 and 206). The accessory lookup table also contains an accessory identity associated with each voltage level range. In particular, the controller 108 determines if the voltage level on the audio in line 132 falls within a first voltage level range defined by voltage level V1 and voltage level V2, which are preferably approximately 1.6 V and approximately 1.9 V, respectively (at step 204). If the voltage level on the audio in line 132 falls within the first voltage level range, the controller 108 identifies the accessory 104 from the accessory lookup table as a mid rate charger (at step 208).

If the voltage level on the audio in line 132 does not fall within the first voltage level range, the controller 108 determines if the voltage level on the audio in line 132 falls within a second voltage level range defined by voltage level V3 and voltage level V4, approximately 3.6 V and approximately 4.2 V, respectively (at step 206). If the voltage level on the audio in line 132 falls within the second voltage level range, the controller 108 identifies the accessory 104 from the accessory lookup table as a fast rate charger (at step 210). If the voltage level on the audio in line 132 does not fall within the second voltage level range, the controller 108 ends the method (at step 212).

The accessory lookup table is described above as only containing voltage level ranges and identities associated with two accessories. However, one skilled in the art will recognize that the accessory lookup table could be made larger to contain additional voltage level ranges and accessory identities, and that the method of FIG. 2 could be easily modified such that the controller 108 continues to traverse the larger lookup table following step 206 and prior to ending the method at step 212.

Next, the controller 108 determines if the voltage and the temperature of the battery 103 are within a predetermined range for charging the battery 103 at a mid rate (at step 218) or a fast rate (at step 220). The controller 108 determines if a voltage level of the battery voltage supply measured on line 118 falls within a suitable charging voltage range stored in the memory 109, such as the voltage range of approximately 5.8 V to approximately 7.8 V. The controller 108 also determines if a temperature level of the battery 103 indicated by the temperature signal measured on line 119 falls within a suitable charging temperature range stored in the memory 109, such as the temperature range of approximately 5° C. to 40° C.

If the voltage level and the temperature level fall within suitable ranges, the controller 108 initiates charging of the battery 103 at the mid or fast rate by placing an enable signal on line 144 (at step 214). The enable signal drives the control switch 143 to turn on the transistor switch 142 and conduct current supplied by the external power supply at the supply terminal 114 to the electrochemical cell 160 of the battery 103 via the battery terminal 115. The current supplied by the external power supply at the mid or fast rate charges the battery 103. The controller 108 maintains the enable signal on the line 144 as long as the battery 103 remains within the voltage and temperature range at step 214 and is determined to be not fully charged (at step 218). In the illustrated embodiment, the controller 108 determines that the battery 103 is fully charged when the temperature of the battery 103 exceeds 45 ° C. Once the battery 103 is fully charged, the controller 108 ends the method (at step 212).

By using the AUD OUT and IN information pins 179 and 124 and audio out and in lines 187 and 132 to communicate the identity of the accessory 104 to the electronic device 102, the accessory identification system 100 remains backwards compatible with other previous accessories of the electronic device 102 that attach to the connector 122. For example, attachment of the Original Ultra Saver accessory manufactured and sold by Motorola, Inc. as model number SLN9739, to the connector 122 generates a 0 V voltage level on the audio in line 132 that is not within the voltage level ranges of the aforementioned mid and fast rate chargers. Also, attachment of the Zero Install Hands-Free Adapter accessory manufactured and sold by Motorola, Inc. as model number SLN3595, to the connector 122 generates an 8 V voltage level on the audio in line 132 that is not within the voltage level ranges of the aforementioned mid and fast rate charger accessories.

Use of the identification element 174 and the identification network 150 to identify the accessory 104 to the electronic device 102 is not limited to those accessories that do not output/receive audio to/from the electronic device 102 (i.e., the mid and fast rate chargers described above). For example, a hands-free accessory, which continually supplies microphone audio signals for the electronic device 102 via the path of audio out line 187–pin 179–pin 124–audio in line 132, could employ, for example, a 11.2 kΩ resistor as the identification element 174. The 11.2 kΩ resistor in conjunction with the identification network 150 having the 30 kΩ impedance generates a voltage level of approximately 5.7 V at the audio in line 132. The microphone audio signals generated by the hands-free accessory during operation thereof are modulated on the voltage level at the audio in line 132. The controller 108 filters the modulated signal to extract the audio signals for use by the electronic device 102 and the voltage level for use in identifying the accessory 104. As such, the voltage level on the audio in line 132 generated by the identification element 174 and the identification network 150 from the connection of the audio pins 179 and 124 does not interfere with audio signals generated and output by the accessory 104 during operation thereof.

Although shown to be connected to the AUD OUT information pin 179 and the AUD IN information pin 124, one skilled in the art will recognize that the identification element 174 and the identification network 150, respectively, could alternatively be connected to R DATA information pins 181 and 127, C DATA information pins 182 and 128, or T DATA information pins 183 and 129, respectively, to facilitate identification of the accessory 104 to the controller 108.

Thus, it can be seen that an improved accessory identification apparatus and method can be implemented that achieves identification by reusing an information pin of a connector, previously used only to receive information generated from operation of the accessory. Accessory identification can be easily accomplished by coupling a low cost resistor network to the audio in pin of the connector of an electronic device and coupling a single low cost resistor to an audio out pin of a mating connector of the accessory and an external power supply of the accessory. When the connectors are mated, the external power supply drives the resistor and resistor network to generate a voltage level from which the identity of the accessory can be determined. The resistors are selected to provide a unique electrical signature for each type of accessory and arranged to prevent interference with audio generated from operation of the accessory and supplied to the electronic device. As such, accessory identification can be achieved in a cost effective manner without modification of the accessory connector, thereby maintaining backwards compatibility with existing accessories that use the accessory connector.

What is claimed is:

1. An accessory identification apparatus for use by an electronic device, the apparatus comprising:

a connector to couple to an accessory, the connector including an information pin designated to receive information generated from operation of the accessory, and wherein the information pin is an audio in pin; and a controller coupled to the connector, the controller to identify the accessory from a voltage level generated by attachment of the accessory to the information pin.

2. An accessory identification apparatus according to claim 1 wherein the connector further comprises an audio out pin, an external power supply pin, a ground pin, and at least one data pin.

3. An electronic device comprising:

a connector to couple to an accessory, the connector having an audio in pin designated to receive audio generated from operation of the accessory;

an identification network coupled to the audio in pin, the identification network having a predetermined impedance; and a controller coupled to the identification network, the controller, upon attachment of the accessory to the connector, to identify the accessory from a voltage level generated by the identification network and the audio in pin.

4. An accessory identification apparatus for use in an accessory, the apparatus comprising:

a connector to couple to an electronic device, the connector including an information pin designated to supply information generated from operation of the accessory, and wherein the information pin is an audio out pin; and an identification element coupled to the connector, the identification element, upon attachment of the connector to the electronic device, to provide an identity of the accessory via the information pin.

5. An accessory identification apparatus according to claim 4 wherein the connector further comprises an audio in pin, an external power supply pin, a ground pin, and at least one data pin.

6. An accessory identification method comprising the steps of:

providing an information pin designated to receive information generated from operation of an accessory;

detecting attachment of the accessory;

detecting a voltage level generated from attachment of the information pin to the accessory;

identifying the accessory from the voltage level; and receiving audio on the information pin.

\* \* \* \* \*